(12) United States Patent
Skarby

(10) Patent No.: US 6,925,312 B2
(45) Date of Patent: Aug. 2, 2005

(54) SHARING OF ANTENNAS BY BASE STATION NODES OF TELECOMMUNICATIONS NETWORK

(75) Inventor: Ulf Skarby, Lidingo (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 858 days.

(21) Appl. No.: 09/953,244

(22) Filed: Sep. 17, 2001

(65) Prior Publication Data

US 2003/0054861 A1 Mar. 20, 2003

(51) Int. Cl.$^7$ ................................................ H04B 1/38
(52) U.S. Cl. ....................... 455/561; 455/67.4; 455/424; 455/562; 455/426; 455/432; 455/272; 455/273
(58) Field of Search ............................. 455/561, 67.4, 455/424, 562, 426, 432, 272, 273

(56) References Cited

U.S. PATENT DOCUMENTS 6,366,789 B1 * 4/2002 Hildebrand ................. 455/561

FOREIGN PATENT DOCUMENTS

| EP | 0 741 463 A2 | 11/1996 |
|---|---|---|
| WO | 01/35684 A2 | 5/2001 |

* cited by examiner

Primary Examiner—Allan Hoosain
(74) Attorney, Agent, or Firm—Nixon & Vanderhye, P.C.

(57) ABSTRACT

A first radio base station ($28_1$) and a second radio base station ($28_2$) are co-located at a base station site (20) and share the base station site's common antenna (22). The common (shared) antenna is connected through an amplifier ($32_1$) of the first radio base station (which serves as a master amplifier) and an antenna sharing unit 50 to remaining components ($34_1$) of the first radio base station, and also through the master amplifier and the antenna sharing unit to an amplifier ($32_2$) and remaining components ($34_2$) of the second radio base station. The antenna sharing unit (50), also known as the "coupler", includes a tower mounted amplifier simulator (64).

17 Claims, 7 Drawing Sheets

SHARING OF ANTENNAS BY BASE STATION NODES OF TELECOMMUNICATIONS NETWORK

BACKGROUND

1. Field of the Invention

The present invention pertains to wireless telecommunications, and particularly to the sharing of antennas by plural radio base station nodes.

2. Related Art and other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a radio base station node. A cell is a geographical area where radio coverage is provided by the radio base station equipment at a base station site. Each cell is identified by a unique identity, which is broadcast in the cell. The radio base stations communicate over the air interface (e.g., radio frequencies) with the user equipment units (UE) within range of the base stations. In the radio access network, several radio base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies. In the UTRAN, a radio base station node is also referred to as a B-node or node B. As used herein, the terms "base station", "radio base station", or the like shall be understood to encompass all types of radio base station nodes, including the B-node of the UTRAN.

A radio base station might employ a tower mounted amplifier ("TMA"). Tower mounted amplifiers (TMAs) are generally of three different types. A first and basic type of TMA is for receiving only, and has a receiver (RX) input coming from a receive antenna and a receiver (RX) output going to a feeder. A second type is a duplex TMA (denoted dTMA) which connects to a combined transmit and receive antenna and is connected to a transmit (TX) feeder and a receiver (RX) feeder. A third type is a dual duplex TMA (denoted ddTMA) which is connected to a combined transmit and receive antenna and a combined feeder (used both for receiving and transmitting).

It can occur that a radio access network operator may desire to situate a new radio base station on a site where another radio base station operates. The new radio base station may be of the same or different telecommunications network technology (e.g., a same or different standard) than the existing/older radio base station. For example, the new radio base station may be a node-B which functions in conjunction with a UTRAN, while the co-located older radio base station may be a node of a GSM network.

Perhaps the most straightforward approach for co-locating two radio base stations is to put up new antennas and feeders at the same site for the new radio base station. While this may, in some instances, be an optimum solution, there is considerable cost involved in climbing the mast to install a new antenna. Moreover, the weight of the new equipment may be too great for the mast, or there might be some other problem with allowance. In some situations, The co-location of the new radio base station with the older radio base station achieves some efficiencies and economies, particularly in the sharing of antennae and feeders for the antennae.

One of several prior art methods could be utilized for enabling two radio base stations to share receiver antennas on the same frequency band. A sharing of transmit antennas results in a power loss of approximately 3.5 decibels (dB). If antenna sharing is structured incorrectly, there may be undesirable results such as loss of sensitivity, an inaccurate receiver level, or considerably more intermodulation. Moreover, inept antenna sharing may spoil the alarm handling at the base station. In this regard, a tower mounted antenna (TMA) sends its alarms through the DC-supply current (e.g., if the current is outside prescribed limits, an alarm occurs). Service personnel typically have to visit a base station site when an alarm occurs.

A first possible method whereby two radio base stations can share antenna is sometimes referred to as the "tower mounted amplifier (TMA) on-ground solution". As its name implies, with the tower mounted amplifier (TMA) on-ground solution a tower mounted amplifier (TMA) is situated on the ground, and connected much in the example manner illustrated in FIG. 1. In the tower mounted amplifier (TMA) on-ground solution, a receiver output port of the tower mounted amplifier (TMA) is connected to an input port of a splitter, with output ports of the splitter being connected to the receiver bandpass filters, and ultimately to the low noise amplifiers (LNAs), of the two base stations (e.g., of a main radio base station and a co-sited radio base station). The first of the two radio base stations has its bandpass filter and LNAs housed in a first radio base station cabinet, while the second of the two radio base stations has its bandpass filter and LNAs housed in a second radio base station cabinet. The splitter, feeder, TMA, and antenna are considered external equipment since they are outside of the cabinets. Unfortunately, if a customer (network operator) purchases a tower mounted amplifier (TMA), installation of such a tower mounted amplifier (TMA) will influence the overall mean time between failure (MTBF), which is a statistical value of how often a fault occurs. Moreover, installation of a tower mounted amplifier (TMA) involves adding external equipment outside the cabinet, which could present spatial and/or environmental issues (particularly in the case of an outdoor radio base station.

A second possible method is known as the "raw split". The raw split sharing method resembles the tower mounted amplifier (TMA) on-ground solution, but does not have a tower mounted amplifier (TMA). However, in the raw split method even if the antenna sharing is performed correctly, there is much sensitivity loss (3.5 dB) since the overall noise figure is increased.

A third possible method is a technique of using the old radio base station as a "master" and to feed the receiver of the old radio base station to the new radio base station. Yet this technique has the disadvantage of necessitating considerable work with respect to the old radio base station.

There are other possible methods which involve (in various ways) connecting the receive path of the new radio base station to the old radio base station but keeping the overall gain of 0 dB (in order to keep the same receive level to the transceiver [TRX]).

What is needed, therefore, and an object of the present invention, is a technique for allowing co-located radio base stations to share antenna without undesirable operational effects.

BRIEF SUMMARY OF THE INVENTION

A first radio base station and a second radio base station are co-located at a base station site and share the base station site's common antenna. The common (shared) antenna is connected through an amplifier of the first radio base station (which serves as a master amplifier) and an antenna sharing unit to remaining components of the first radio base station, and also through the master amplifier and the antenna sharing unit to an amplifier for the second radio base station.

The antenna sharing unit, also known as the "coupler", includes an element which simulates a tower mounted amplifier in the sense that its consumes as much current as a tower mounted amplifier, for which reason the element is also known herein as a tower mounted amplifier simulator. The antenna sharing unit comprises three ports, including a first port which is connected to an output terminal of the master amplifier; a second port which is connected to other components of the first radio base station; and a third port which is connected to the amplifier of the second radio base station. The antenna sharing unit further comprises two transmission lines, particularly a first transmission line which connects the first port to the second port and a second transmission line which is electromagnetically coupled to the first transmission line and also connected to the third port. A direct current blocking element is connected to the second transmission line. A series connection of an RF blocking element and the tower mounted amplifier simulator are connected between the second transmission line and electrical ground. The tower mounted amplifier simulator can take various forms, such as a resistance or a current generator, for example. The coupler is connected through the third port to an antenna reference point of a receiver bandpass filter of the second radio base station. The receiver bandpass filter of the second radio base station is connected to the amplifier of the second radio base station.

The present invention not only concerns the base station site, but also the antenna sharing unit as well, and also a method of using the antenna sharing unit to transform a base station site from a single radio base station site to a multiple radio base station site.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
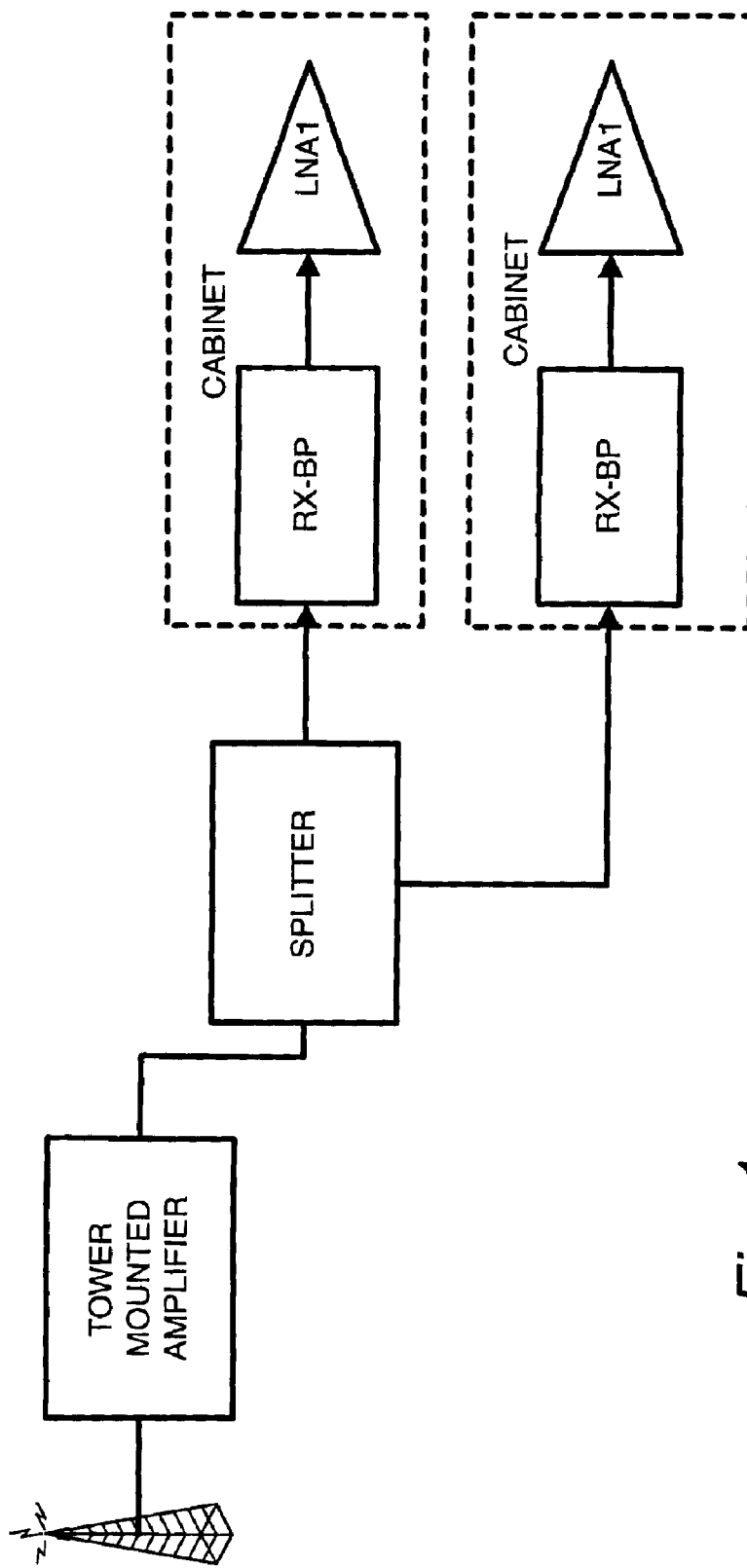
FIG. 1 is diagrammatic view of two co-located radio base stations configured according to a prior art tower mounted amplifier (TMA) on-ground solution.
Figure 2:
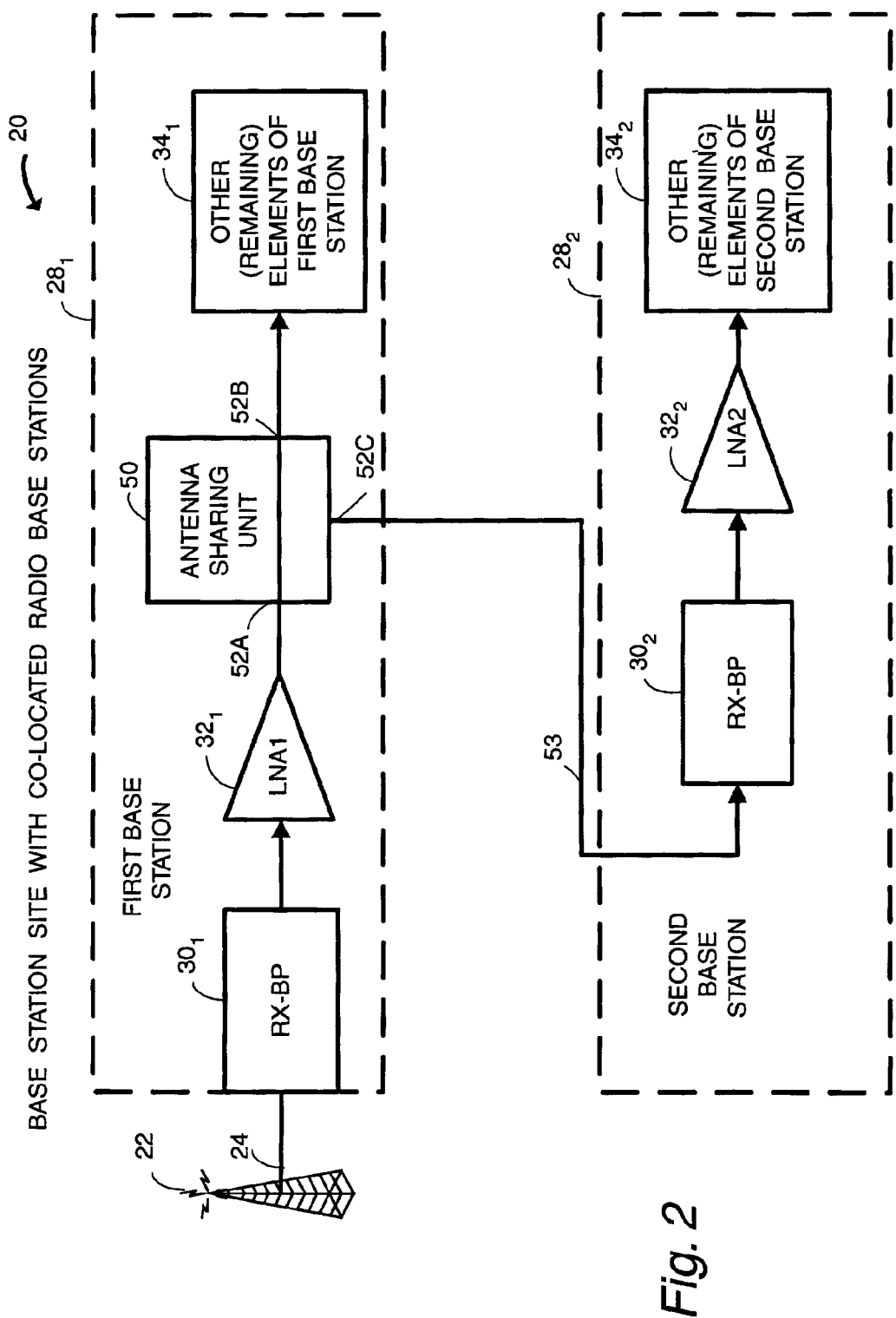
FIG. 2 is diagrammatic view of two co-located radio base stations configured according to a non-limiting, representative implementation of the present invention.

The present invention concerns co-location of a first radio base station and a second radio base station at a same base station site, and sharing by the first radio base station and the a second radio base station of a common (shared) antenna of the base station site. An example such base station site 20 is shown in FIG. 2 with its shared antenna 22 and its feeder 24. A broken line labeled as $28_1$ frames elements or components of a first base station, while a broken line labeled as $28_2$ frames elements or components of a first base station The first radio base station $28_1$ includes a receiver bandpass filter (RX-BP) $30_1$ and an amplifier $32_1$. Other elements or components of the first radio base station $28_1$ are depicted by a block $34_1$. Similarly, the second radio base station $28_2$ includes a receiver bandpass filter (RX-BP) $30_2$ and an amplifier $32_2$. Other elements or components of the second radio base station $28_2$ are depicted by a block $34_2$.

The amplifiers $32_1$ and $32_2$ shown in the FIG. 2 implementation are preferably low noise amplifiers (LNAs). The amplifier $32_1$ is also known herein as the "master" amplifier for the base station site 20.

The base station site 20 of the present invention features an antenna sharing unit (ASU) 50, also known as a "coupler". The common (shared) antenna 22 is connected through the receiver bandpass filter (RX-BP) $30_1$, the amplifier $32_1$ of the first radio base station $28_1$ (which serves as the master amplifier), and the antenna sharing unit 50 to the remaining components $34_1$ of the first radio base station $28_1$. Also, the shared antenna 22 is connected through the receiver bandpass filter (RX-BP) $30_1$, the amplifier $32_1$ of the first radio base station $28_1$, and the antenna sharing unit 50 to the receiver bandpass filter (RX-BP) $30_2$, the amplifier $32_2$, and ultimately to the remaining components $34_2$ of the second radio base station $28_2$.

Specifically, the feeder 24 connects to an input terminal of the receiver bandpass filter (RX-BP) $30_1$. An output terminal of the receiver bandpass filter (RX-BP) $30_1$ connects to an input terminal of the master amplifier 321. Thus, the input terminal of the master amplifier $32_1$ is connected to the shared antenna 22.

The antenna sharing unit comprises three ports 52A, 52B, and 52G. The first port (port 52A) is connected to the output terminal of the master amplifier $32_1$. The second port (port 52B) is connected to the remaining elements $34_1$ of the first radio base station $28_1$. The third port (port 52C) is connected by a co-siting cable 53 to the receiver bandpass filter (RX-BP) $30_2$, which in turn is connected to the amplifier $32_2$ of the second radio base station $28_2$.

Concerning the second radio base station $28_2$, an output terminal of the receiver bandpass filter (RX-BP) $30_2$ is connected to an input terminal of amplifier $32_2$. An output terminal of the amplifier $32_2$ is connected to the remaining (other) elements of second radio base station $28_2$.

Figure 3:
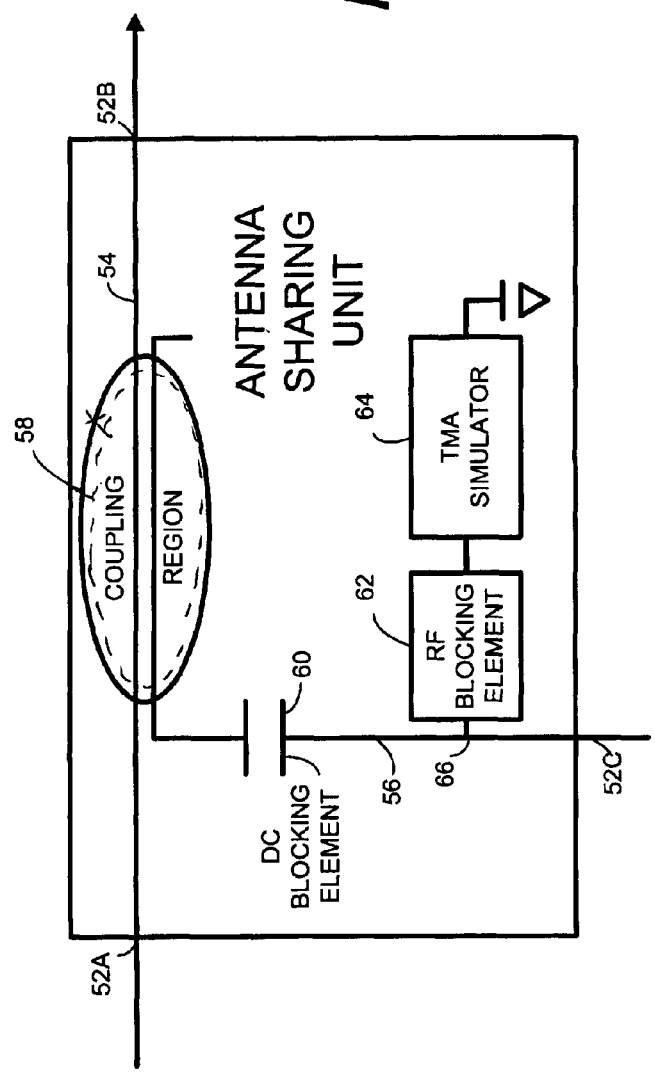
FIG. 3 is a diagrammatic view of an antenna sharing unit utilized in a base station site according to the implementation of FIG. 2.

As shown in more detail in FIG. 3, the antenna sharing unit 50 of FIG. 2 comprises two transmission lines, particularly first transmission line 54 and second transmission line 56. The first transmission line 54 serves to connect the first port 52A to the second port 52B. The second transmission line 56 has a first end which is electromagnetically coupled to the first transmission line 54. The coupling is depicted in FIG. 3 by the broken line circle which bears reference numeral 58. A second end of second transmission line 56 is connected to the third port 52C. A direct current blocking element 60 is connected on the second transmission line 56 intermediate coupling region 58 and the third port 52C. In an example implementation, the direct current blocking element 60 can take any suitable form, such as a stripline or a capacitance, for example. A series connection of a RF (radio frequency) blocking element 62 and a TMA-simulator 64 are connected between the second transmission line 56 and electrical ground. In particular, the series connection of RF blocking element 62 and TMA-simulator 64 is connected to a point 66 on second transmission line 56 which is intermediate the direct current blocking element 60 and the third port 52C. The RF blocking element 62 can take various forms, such as a coil, for example.

Figure 4:
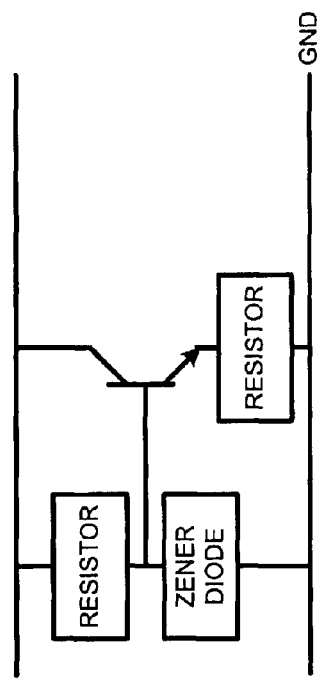
FIG. 4 is a schematic view of an embodiment of an antenna sharing unit in which a tower mounted amplifier simulator which takes the form of current generator.

The TMA-simulator 64 serves to simulate a tower mounted amplifier (TMA) in the sense that it consumes as much current as does a tower mounted amplifier, e.g., since a bias current for the simulated tower mounted amplifier (TMA) runs through the TMA-simulator 64. The TMA-simulator 64 can also take various forms, such as (for example) a resistance or a current generator. A current generator is a circuit that, essentially independently of voltage, generates a constant current. An example current generator circuit is shown in FIG. 4.

Figure 5A:
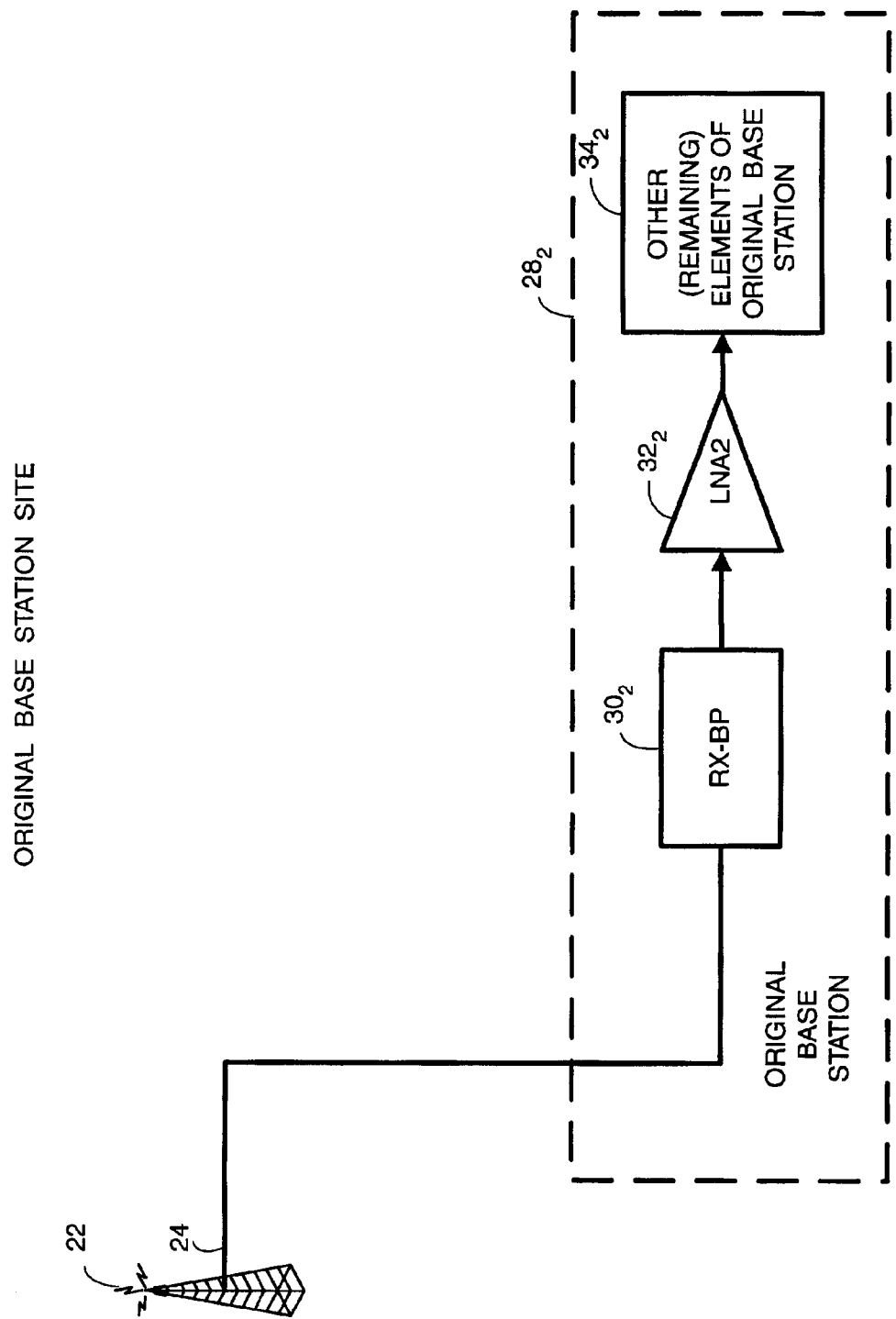
FIG. 5A–FIG. 5D are diagrammatic views showing stages of augmentation of a base station site in accordance with a mode of the present invention.

The base station site 20 with its co-located radio base stations can result from many scenarios. One particular scenario of augmenting a base station site in accordance with the present invention is depicted in FIG. 5A–FIG. 5D. FIG. 5A shows that the base station site initially has only one radio base station, which will also be termed an original base station. The original radio base station corresponds to the radio base station which, in FIG. 2, had reference numerals including the subscript "2". Thus, FIG. 5A shows the original radio base station $28_2$ (the pre-existing radio base station) and the components of its cabinet, all previously described. However, in its initial installment, the original radio base station $28_2$ has the antenna reference point (ARP) of its receiver bandpass filter (RX-BP) $30_2$ connected directly by feeder 24 to antenna 22.

Figure 5B:
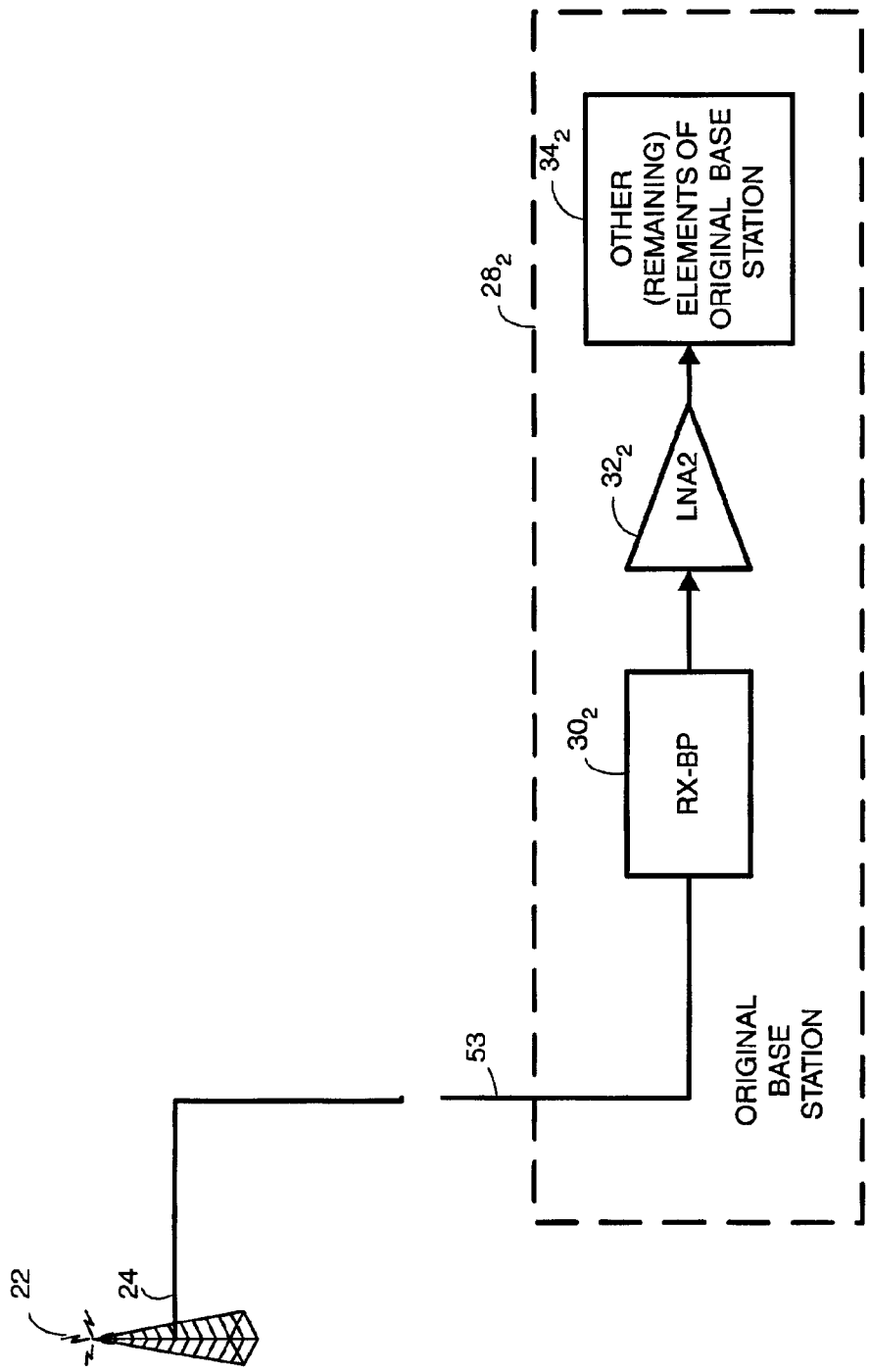
Figure 5C:
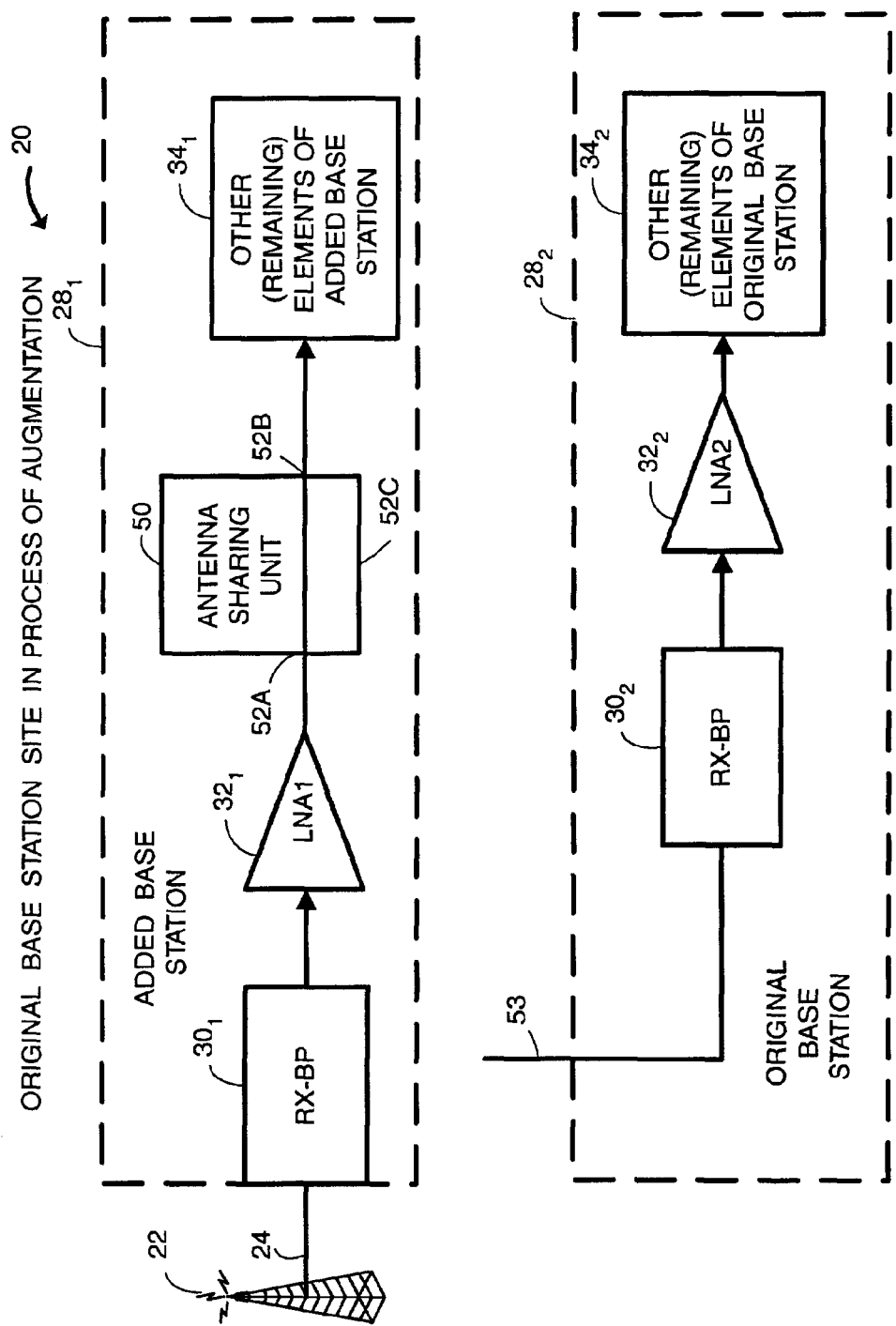
Figure 5D:
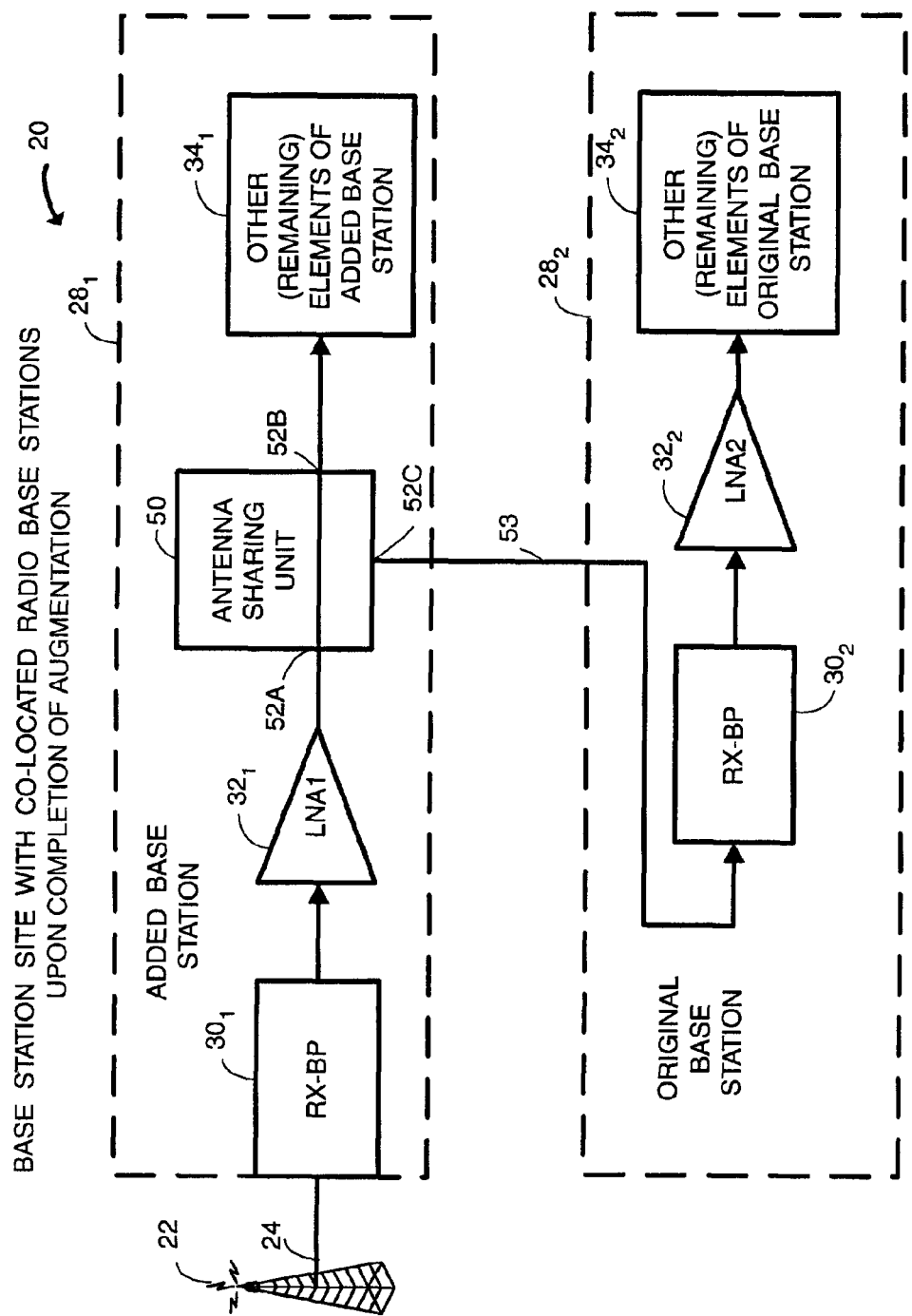

As one step in the process of augmenting the original base station site, FIG. 5B shows that feeder 24 is disconnected from the antenna reference point (ARP) of its receiver bandpass filter (RX-BP) $30_2$ of original radio base station $28_2$. Then, as shown in FIG. 5C, an added base station $28_1$ is connected to the feeder 24. Specifically, the feeder 24 is connected to the antenna reference point of the receiver bandpass filter (RX-BP) $30_1$ of the added base station $28_1$.

The added radio base station of FIG. 5C corresponds to the radio base station $28_1$ of FIG. 2, and as such as the antenna sharing unit 50 included therein. Advantageously, the cabinet of a radio base station which is to be added to an existing radio base station site, such as radio base station $28_1$, can be fabricated to include the antenna sharing unit 50 (e.g., the antenna sharing unit 50 can be pre-mounted or pre-installed in the radio base station $28_1$).

After the added radio base station $28_1$ has been connected to feeder 24, a second end of the line 53 (which has its first end already connected to the antenna reference point of the receiver bandpass filter (RX-BP) $30_2$ of the original base station $28_2$) is connected to port 52C of antenna sharing unit 50. These basic steps show the simplicity of augmentation of a single base station site to a multi-base station site using the antenna sharing unit 50 of the present invention.

The original radio base station $28_2$ and added radio base station $28_1$ can be of the same, or differing, telecommunication technologies (e.g., GSM, UTRAN, etc.). While the antenna sharing unit 50 has been described herein as being incorporated into an added radio base station cabinet, such need not be necessary (e.g., the antenna sharing unit 50 can be a separate unit).

The person skilled in the art will appreciate the functions performed by a radio base station, and accordingly the nature of the other or remaining elements depicted by blocks $34_1$ and $34_2$ in FIG. 2. For example, a typical radio base station has a data processing and control unit, an interface for communicating with a master node (e.g., a base station controller [BSC] node or a radio network controller [RNC] node); and plural processing boards or circuits.

The present invention advantageously facilitates sharing of antennas with minimum impact on the radio frequency performance and the alarm handling. The antenna sharing unit 50 preserves parameters as if the antenna sharing unit 50 were a tower mounted amplifier. Moreover, no alarms will be changed in the second radio base station $28_2$ since the TMA simulator 64 actually simulates a tower mounted amplifier (TMA), so that if the co-siting cable is broken or not connected an alarm will emanate with respect to the second radio base station $28_2$.

Parameters preserved by the antenna sharing unit 50 include a sensitivity parameter, which is a parameter stating the lowest possible signal level which can be "heard". The sensitivity depends on the background noise (thermal noise), a factor that makes it possible to hear and the noise in the amplifiers. The parameter for the noise in the amplifiers is called "noise figure". The relation of different stages of amplifier's noise figures is stated in Friis' formula (see Expression 1).

$$NFtot=NF1+(NF2-1)/G1+(NF3-1)/G1*G2, \text{etc.} \quad \text{Expression 1:}$$

In Expression 1: NFtot is the total noise figure; NF1 is the noise figure of the first amplifier; NF2 is the noise figure of the second amplifier; NF3 is the noise figure of the third amplifier; G1 is the gain of the first amplifier; G2 is the gain of the second amplifier, and so forth. In Expression 1, all figures are in times (not decibels).

To remain at a low NFtot, a Gain must be inserted in the first amplifier to lower the influence of the second amplifier.

However, the gain cannot be too high because the gain introduces more intermodulation and the dynamic range would then be lower. It is also important that the overall gain be preserved, otherwise the hand over to another radio base station (RBS) can be jeopardized since that radio base station would get the wrong receive (RX) level values.

The gain in the amplifier $32_2$ can be reduced, meaning that there can be some gain before amplifier $32_2$ and still remaining the overall gain (receiver level). By doing this the noise factor for the co-sited radio base station (e.g., base station site 20) has a very small influence. In some radio base stations, the reduction of the amplifier $32_2$ is done automatically when the system senses that DC current is floating through the feeder.

Advantageously, the present invention does not influence the alarms in the base station site 20, since the base station site 20 looks as if it has a tower mounted amplifier (TMA). Moreover, if the co-siting cable 53 breaks between the two radio base stations, e.g., between first radio base station $28_1$ and second radio base station $28_2$, there will be an alarm. Further, since the antenna sharing unit 50 is inserted in the new radio base station, the only site work is to redraw the RX feeders to the new radio base station, and to put the co-siting cables between the radio base stations. The co-siting cables should have an attenuation chosen so that the gain at the antenna reference point (ARP) of the second radio base station, e.g., at the input terminal to receiver bandpass filter (RX-BP) $30_2$, has the correct value.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coupler which facilitates co-location of a first radio base station and a second radio base station, the coupler comprising:
   a coupler first port through which the coupler can be connected to via a first amplifier to an antenna which is utilized by both the first radio base station and the second radio base station;
   a coupler second port;
   a coupler third port;
   a first transmission line connecting the coupler first port to the coupler second port;
   a second transmission line electromagnetically coupled to the first transmission line and connected to the third port; and
   a tower mounted amplifier simulator connected to the second transmission line.

2. The coupler of claim 1, wherein the tower mounted amplifier simulator comprises a resistance with bias current for the tower mounted amplifier simulator going through the resistance.

3. The coupler of claim 1, wherein the tower mounted amplifier simulator comprises a current generator with bias current for the tower mounted amplifier simulator being supplied by the current generator.

4. The coupler of claim 1, further comprising:
   a direct current blocking element connected to the second transmission line;
   a series connection of an RF blocking element and the tower mounted amplifier simulator being connected between the second transmission line and electrical ground.

5. The coupler of claim 1, wherein the coupler can be connected through the coupler third port to an antenna reference point of a receiver bandpass filter of the second radio base station.

6. A base station site at which a first radio base station and a second radio base station are co-located, the base station site comprising:
   an antenna which is shared by the first radio base station and the second radio base station;
   a master amplifier having an input terminal and an output terminal, the input terminal of the master amplifier being connected to the antenna;
   an amplifier for the second radio base station;
   an antenna sharing unit connected between the output terminal of the master amplifier and the amplifier for the second radio base station, the antenna sharing unit including a tower mounted amplifier simulator.

7. The apparatus of claim 6, wherein the antenna sharing unit comprises:
   a first port, a second port, and a third port;
   the first port being connected to the output terminal of the master amplifier; the second port being connected to an element of the first radio base station; and the third port being connected to the amplifier of the second radio base station.

8. The apparatus of claim 6, wherein the antenna sharing unit further comprises:
   a first transmission line connecting the first port to the second port;
   a second transmission line electromagnetically coupled to the first transmission line and connected to the third port;
   the tower mounted amplifier simulator being connected to the second transmission line.

9. The apparatus of claim 6, wherein the tower mounted amplifier simulator comprises a resistance with bias current for the tower mounted amplifier simulator going through the resistance.

10. The apparatus of claim 6, wherein the tower mounted amplifier simulator comprises a current generator with bias current for the tower mounted amplifier simulator being supplied by the current generator.

11. The apparatus of claim 8, further comprising:
    a direct current blocking element connected to the second transmission line;
    a series connection of an RF blocking element and the tower mounted amplifier simulator being connected between the second transmission line and electrical ground.

12. The apparatus of claim 7, wherein the coupler is connected through the third port to an antenna reference point of a receiver bandpass filter of the second radio base station, and wherein the receiver bandpass filter of the second radio base station is connected to the amplifier of the second radio base station.

13. A method of augmenting a base station site having a first radio base station to include further a second radio base station, the method comprising:
    coupling, to a first transmission line connected to an output terminal of an amplifier of the first radio base station, a second transmission line;
    connecting to the second transmission line a tower mounted amplifier simulator;
    connecting the second transmission line to an amplifier of the second radio base station.

14. The method of claim 13, wherein the step of connecting the second transmission line to the amplifier of the second radio base station comprises connecting the second transmission line to an antenna reference point of a bandpass filter of the second radio base station, and connecting an output terminal of the bandpass filter of the second radio base station to an input terminal of the amplifier of the second radio base station.

15. The method of claim 13, further comprising connecting to the second transmission line a direct current blocking element and an RF blocking element.

16. The method of claim 13, further comprising using a resistance as the tower mounted amplifier simulator.

17. The method of claim 13, further comprising using a current generator as the tower mounted amplifier simulator.

* * * * *